March 25, 1947.   S. LEHMAN   2,417,940
PRESSURE DROP ALARM
Filed Oct. 28, 1943   2 Sheets-Sheet 1
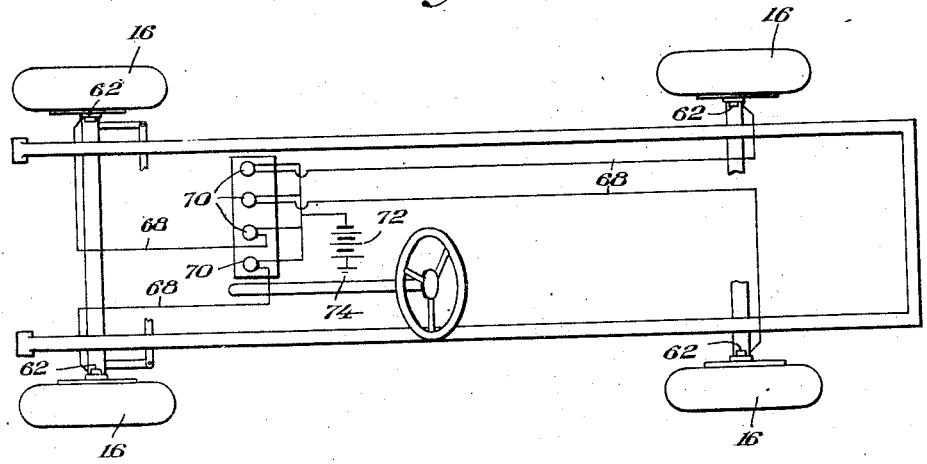
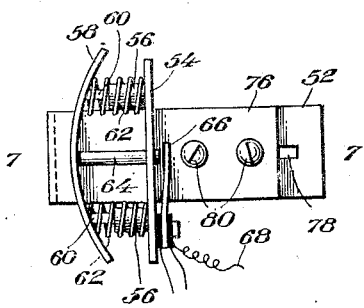
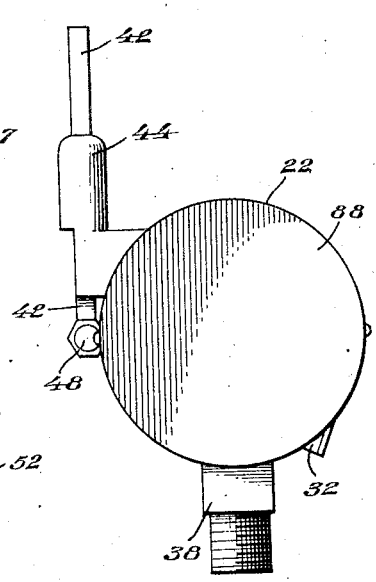
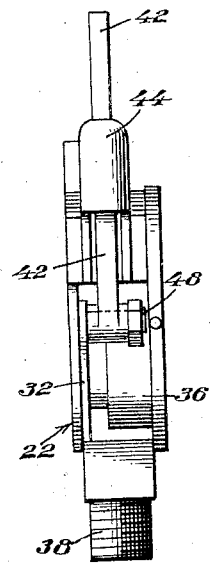
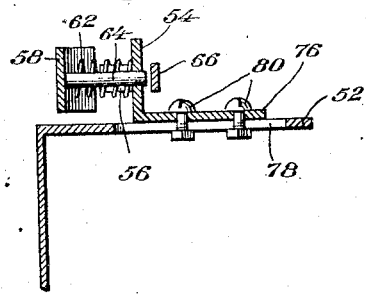
INVENTOR.
Stanley Lehman
BY
Victor J. Evans & Co.
ATTORNEYS

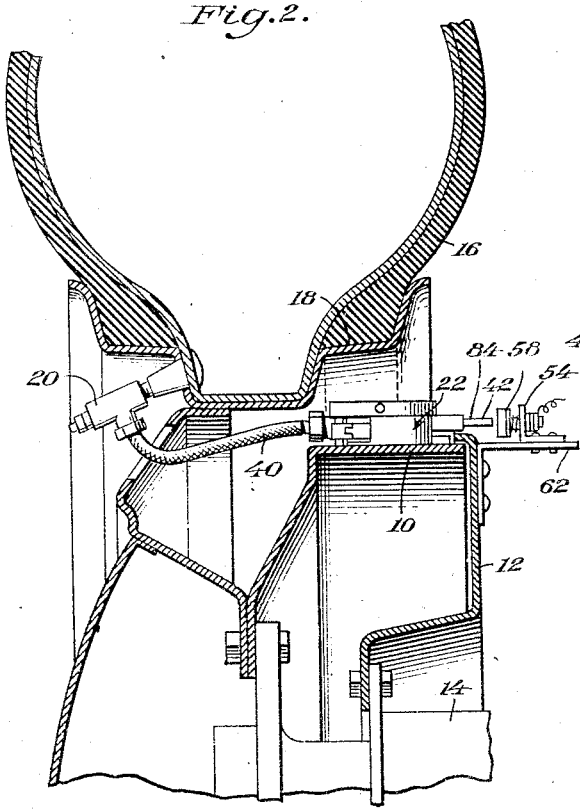
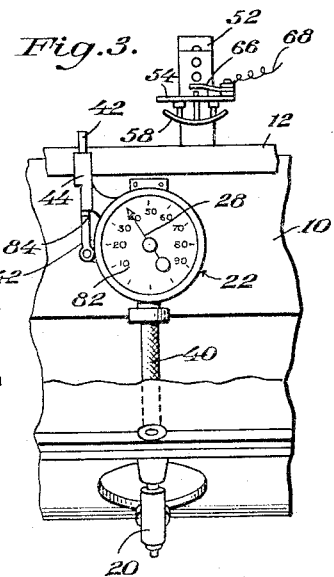
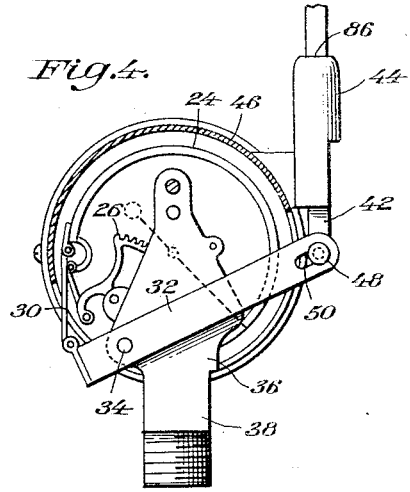
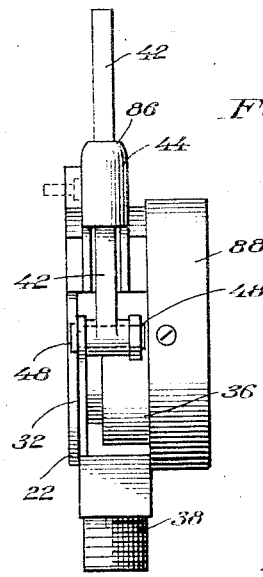

Patented Mar. 25, 1947

2,417,940

UNITED STATES PATENT OFFICE 2,417,940

PRESSURE DROP ALARM

Stanley Lehman, Madison, Wis.

Application October 28, 1943, Serial No. 507,998

3 Claims. (Cl. 200—58)

My invention relates to improvements in low inflation pressure alarms for automotive vehicle tires of the pneumatic type, and has among its objects and advantages the provision of one of a comparatively simple and inexpensive, but highly efficient, combination and construction of instrumentalities and parts, including an electric lamp circuit, with a lamp, a circuit closer, and a pressure responsive device, for each wheel of a vehicle, and wherein each circuit closer is adapted to be actuated by a respective pressure responsive device, upon the deflation of a tire, to flash its respective lamp, as long as the vehicle continues in motion.

In the accompanying drawings:

Figure 1 is a diagrammatic view of an electric alarm circuit and indicating lamps as applied to a vehicle.

Figure 2 is a cross sectional view of a portion of a tire casing and its wheel showing a pressure drop switch applied thereto.

Figure 3 is a plan view of the switch.

Figure 4 is a bottom face view of a part of the switch.

Figure 5 is a side view of the structure of Figure 4.

Figure 6 is a plan view of another part of the switch.

Figure 7 is a sectional view along the line 7—7 of Figure 6.

Figure 8 is a face view of a cover for the switch part of Figure 4, and

Figure 9 is an edge view of the switch part with the cover removed.

In the embodiment of the invention selected for illustration, I make use of a brake drum 10 such as is used in automobile wheels in conjunction with a brake shoe mounting plate 12 fixed to the axle housing 14. The usual tire casing 16 is mounted in the wheel rim structure 18 and is provided with an inflating valve 20.

Upon the brake drum 10 of each of the four wheels of the vehicle is mounted a conventional pressure gage 22. In Figure 4, this gage includes the usual pressure responsive tubular arm 24 connected with a pivoted segmental gear 26 for rotating the pinion (not shown) connected with the indicating needle 28.

To the free end of the arm 24 is pivotally connected one end of a link 30 having its other end pivotally connected with a lever 32. This lever is pivotally connected intermediate its ends at 34 with the pressure inlet housing 36 of the gage. The tubular extension 38 of the housing 36 is connected with a pressure inlet hose 40 tapped into the side of the inflating valve 20.

An elongated member, or rod 42 is slidably guided in a tubular member 44 fixed to the shell 46 of the gage 22. One end of the rod 42 is pivotally connected with the lever 32 by a pin 48 fitting loosely in a slot 50 in the lever. Any variation in the pressure in the tire imparts pivotal movement to the lever 32 and longitudinal movement to the rod 42.

In Figures 2 and 3, a bracket 52 is fixed to the plate 12 and carries a fixed plate 54 provided with spaced tubular bearings 56, see Figure 6. A bowed cam plate 58 carries spaced pins 60 each slidably guided in one of the bearings 56. Compression springs 62 are mounted on the guide pins 60 and the bearings 56 to yieldingly hold the cam plate 58 in the normal position of Figure 6.

To the cam plate 58 is fixed a contact pin 64 extending loosely through an opening in the plate 54. A spring contact 66 has one end attached to the plate 54 and insulated therefrom and is electrically connected by a wire 68 with an indicating lamp 70; four of such lamps being shown in Figure 1, one for each wheel, and all preferably mounted on the instrument panel (not shown) of the vehicle.

All the lamps or signals are electrically connected with a source of current 72, which is grounded at 74, and all the contact pins 64 are grounded to the vehicle so that a lamp 70 will be illuminated whenever its respective contact pin 64 is moved into engagement with a companion spring contact 66.

In operation, proper inflation of the tires 16 holds all the rods 42 in retracted positions. When, however, the pressure in a tire drops to an objectional low value, the rod 42 associated with that tire is projected into the path of its bowed cam plate 58 to move the contact pin 64 into engagement with the spring contact 66 and close the circuit through the signal lamp. The lamp is energized intermittently so long as the vehicle is running so that the flashing signal is readily visible.

The plate 54 is attached to a flange 76 lying on the bracket 52. A slot 78 is provided in the bracket for bolts 80 passed through openings in the flange so that the plate 54, which functions as a carrier for the cam plate 58, may be adjusted toward and away from the rod 42 to accurately position the cam plate with respect to the rod 42.

The gage 22 in Figure 3 is provided with a dial face 82 so that the tire pressure may be ascertained by noting the position of the needle 28. Graduations 84 are provided on the rod 42 for coaction with the end 86 of the member 44, so that the air pressure may also be determined by noting the pressure indicating graduation registering with the end 86.

In Figures 5 and 8, a cover 88 is slipped over the gage 22 to close the face side thereof. In this form, the gage need not a dial face and indicating needle, since the tire pressure may be determined by the position of the rod 42.

Without further elaboration, the foregoing will so fully explain my invention, that others may, by applying current knowledge, readily adapt the same for use under various conditions of service.

I claim:

1. In a periodic electric alarm for use in indicating low vehicle tire inflation pressures, the combination of a pressure responsive device mounted on a wheel and associated with the tire, said device including an elongated member slidably movable into an active position when pressure in the tire lowers and into an inactive position when the pressure in the tire is normal, and a circuit closer supported adjacent the wheel and comprising a stationary plate, tubular bearings spacedly mounted on said plate, a cam-like element adapted to be engaged by said elongated member as the wheel revolves and the pressure in the tire has lowered, guide pins carried by said cam-like element and slidably engaged in said bearings, coil springs engaged on said guide pins and said bearings to support said cam-like element for movement relatively to said plate, a spring contact carried by and insulated from said plate, and a contact member carried by said cam-like element medially between said guide pins and adapted to engage with said spring contact to close the alarm circuit, when the cam-like element is actuated to compress said coil springs by the engagement of said elongated member therewith.

2. The invention as defined in claim 1, with a bracket adapted to be secured to the vehicle body to support said circuit closer in place and having an elongated slot, and means carried by said stationary plate and engaged with said slot to allow for adjustment of the plate and the cam-like element supported therefrom relatively to said elongated member.

3. The invention as defined in claim 1, with an angular bracket adapted to have one of its arms secured to the vehicle chassis and its other arm provided with an elongated slot, said stationary plate having an angular extension slidably supported on said other arm of the bracket, and fastenings carried by said extension and engaged in said slot to allow for adjustment of the plate and the cam-like element supported therefrom relatively to said elongated member.

STANLEY LEHMAN.

REFERENCES CITED

The following references are of record in the file of this patent:

UNITED STATES PATENTS

| Number | Name | Date |
| --- | --- | --- |
| 1,115,022 | Quick | Oct. 27, 1914 |
| 1,703,734 | Henry | Feb. 26, 1929 |
| 885,121 | Winter | Apr. 21, 1908 |
| 1,652,733 | Rouch et al. | Apr. 23, 1924 |
| 2,256,688 | Pierce | Sept. 23, 1941 |
| 1,846,513 | Douglas | Feb. 23, 1932 |